(12) United States Patent
Sethi et al.

(10) Patent No.: US 11,496,894 B2
(45) Date of Patent: Nov. 8, 2022

(54) METHOD AND APPARATUS FOR EXTENSIBLE AUTHENTICATION PROTOCOL

(71) Applicant: Telefonaktiebolaget LM Ericsson (publ), Stockholm (SE)

(72) Inventors: Mohit Sethi, Jorvas (FI); Parth Amin, Jorvas (FI); Patrik Salmela, Jorvas (FI); Kristian Slavov, Jorvas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 391 days.

(21) Appl. No.: 15/749,301

(22) PCT Filed: Aug. 13, 2015

(86) PCT No.: PCT/EP2015/068686
§ 371 (c)(1),
(2) Date: May 11, 2018

(87) PCT Pub. No.: WO2017/025149
PCT Pub. Date: Feb. 16, 2017

(65) Prior Publication Data
US 2018/0310172 A1 Oct. 25, 2018

(51) Int. Cl.
*H04L 29/06* (2006.01)
*H04W 12/06* (2021.01)
(Continued)

(52) U.S. Cl.
CPC .......... *H04W 12/06* (2013.01); *H04L 63/0892* (2013.01); *H04L 63/205* (2013.01);
(Continued)

(58) Field of Classification Search
CPC .......... G06F 21/31; G06F 21/30; G06F 21/44; H04L 63/0892; H04L 63/08;
(Continued)

(56) References Cited

U.S. PATENT DOCUMENTS

| 8,015,594 | B2 * | 9/2011 | Salowey | H04L 63/08 |
| | | | | 726/3 |
| 8,767,526 | B1 * | 7/2014 | Jagannatharao | H04W 12/069 |
| | | | | 370/216 |

(Continued)

OTHER PUBLICATIONS

Pawlowski et al, Extending Extensible Authentication Protocol Over IEEE 802.15.4 Networks, Jul. 2, 2014, IEEE, pp. 340-345. (Year: 2014).*

(Continued)

*Primary Examiner* — Luu T Pham
*Assistant Examiner* — Jenise E Jackson
(74) *Attorney, Agent, or Firm* — Sage Patent Group

(57) ABSTRACT

A method, performed by an EAP authenticator in a communication network, is disclosed. An identification of at least one EAP method supported by an EAP authentication server providing an EAP authentication service to the EAP authenticator is obtained, wherein the identification is obtained from a network entity of the communication network or from inspection of traffic through the EAP authenticator. The identification of at least one EAP method is provided to a device operable to request communication network access from the EAP authenticator. Also disclosed is a method, performed in an EAP authentication server in a communication network. A request for identification of EAP methods supported by the EAP authentication server is received, and a response to the request is sent identifying at least one EAP method supported by the EAP authentication server. An EAP authenticator, EAP authentication server and computer program are also disclosed.

20 Claims, 12 Drawing Sheets

(51) Int. Cl.
*H04L 9/40* (2022.01)
*H04W 84/12* (2009.01)

(52) U.S. Cl.
CPC ............ *H04L 63/08* (2013.01); *H04L 63/162* (2013.01); *H04W 84/12* (2013.01)

(58) Field of Classification Search
CPC ... H04L 61/203; H04L 63/101; H04L 63/205; H04L 63/162; H04W 12/06; H04W 84/12
USPC .............................................................. 726/3
See application file for complete search history.

(56) References Cited

U.S. PATENT DOCUMENTS

| | | | | |
|---|---|---|---|---|
| 2005/0149734 | A1* | 7/2005 | Eronen | H04L 9/002 713/176 |
| 2006/0026671 | A1 | 2/2006 | Potter et al. | |
| 2006/0218393 | A1* | 9/2006 | Hernandez | H04L 63/08 713/167 |
| 2007/0118883 | A1* | 5/2007 | Potter | H04L 63/08 726/4 |
| 2007/0157027 | A1* | 7/2007 | Palekar | H04L 63/0428 713/171 |
| 2007/0217610 | A1* | 9/2007 | Yegani | H04L 63/0892 380/270 |
| 2007/0265005 | A1* | 11/2007 | Sitch | H04W 48/18 455/435.1 |
| 2008/0070544 | A1 | 3/2008 | Lior | |
| 2013/0065585 | A1 | 3/2013 | Pelletier et al. | |
| 2017/0019427 | A1* | 1/2017 | Vank | H04L 63/08 |

OTHER PUBLICATIONS

Chiornita et al, A Practical Analysis of EAP Authentication Methods, Jun. 26, 2010, IEEE, pp. 31-35. (Year: 2010).*
International Search Report and Written Opinion of the International Searching Authority, PCT/EP2015/068686, dated May 25, 2016, 9 pages.
Adrangi, F., et al., "Identity Selection Hints for the Extensible Authentication Protocol (EAP)" (XP015054928) RFC 4284, Internet Engineering Task Force, Jan. 1, 2006, 14 pages.
Winter, S., "Considerations regarding the correct use of EAP-Response/Identity," Internet Draft (https://datatracker.ietf.org/doc/draft-winter-radext-populating-eapidentity-01.com) Oct. 27, 2014, 7 pages.
Sethi, M., et al., "Secure Bootstrapping of Clout-Managed Ubiquitous Displays," UBICOMP '14, Sep. 13-17, 2014, Seattle, WA, pp. 739-750.
Hotspot 2.0 (Release 2) Technical Specification, Version 1.0.0, Aug. 8, 2014, Copyright 2014, WiFi Alliance, 207 pages.

* cited by examiner

```
+-+-+-+-+-+-+-+-+-+-+-+-+-+-+-+-+-+-+-+-+-+-+-+-+-+-+-+-+-+-+-+-+
|   Code    |  Identifier  |         Length              |
+-+-+-+-+-+-+-+-+-+-+-+-+-+-+-+-+-+-+-+-+-+-+-+-+-+-+-+-+-+-+-+-+
|                                                        |
|       EAP-STATUS                                       |
|                                                        |
|                                                        |
+-+-+-+-+-+-+-+-+-+-+-+-+-+-+-+-+-+-+-+-+-+-+-+-+-+-+-+-+-+-+-+-+
| Attributes... |
+-+-+-+-+-+-+-+-+-+
```

Figure 6

```
+-+-+-+-+-+-+-+-+-+-+-+-+-+-+-+-+-+-+-+-+-+-+-+-+-+-+-+-+-+-+-+-+
|   Code    |  Identifier  |         Length              |
+-+-+-+-+-+-+-+-+-+-+-+-+-+-+-+-+-+-+-+-+-+-+-+-+-+-+-+-+-+-+-+-+
|                                                        |
|    EAP-STATUS-RESPONSE                                 |
|                                                        |
|                                                        |
+-+-+-+-+-+-+-+-+-+-+-+-+-+-+-+-+-+-+-+-+-+-+-+-+-+-+-+-+-+-+-+-+
| Attributes... |
+-+-+-+-+-+-+-+-+-+
```

Figure 7

METHOD AND APPARATUS FOR EXTENSIBLE AUTHENTICATION PROTOCOL

CROSS REFERENCE TO RELATED APPLICATIONS

This application is a 35 U.S.C. § 371 national stage application of PCT International Application No. PCT/EP2015/068686 filed on Aug. 13, 2015, the disclosure and content of which is incorporated by reference herein in its entirety.

TECHNICAL FIELD

The present invention relates to methods performed in an Extensible Authentication Protocol (EAP) authenticator, and in an EAP authentication server. The present invention also relates to an EAP authenticator and an EAP authentication server, and to a computer program configured to carry out methods performed in an EAP authenticator and an EAP authentication server.

BACKGROUND

The Extensible Authentication protocol (EAP) is an authentication framework which may be used in the management of access to communication networks. EAP defines common functions, message formats and negotiation of authentication methods. A range of different EAP methods are defined in Internet Engineering Task Force (IETF) Request for Comments (RFC) documents. EAP messages may be encapsulated in different ways according to different protocols. The Institute of Electrical and Electronics Engineers (IEEE) family 802 of standard documents defines local and metropolitan area networks (LAN, MAN), and IEEE standard document 802.1X defines the encapsulation of EAP over IEEE 802, which is known as EAP over LAN, or EAPOL. FIG. 1 illustrates a typical enterprise authentication network arrangement according to IEEE 802.1X. Referring to FIG. 1, a mobile device 2 requests internet access through a wireless Access Point (AP) 4 conforming to IEEE 802.11. The wireless AP 4 requires 802.1X authentication of wireless clients, also known as supplicants, in order to allow them access to the network. The wireless AP 4 is paired with a local, or home, RADIUS server 6, which may in turn be paired with other remote RADIUS servers 8, which are trusted by the home RADIUS server 6. The trust relationship may be established when the home and remote RADIUS servers are paired, and the decision to trust is usually left to network administrators, who decide whether to pair their home RADIUS servers with other RADIUS servers, and if so, which other RADIUS servers should be trusted. While RADIUS servers are illustrated as a typical example, the home and remote servers for the arrangement of FIG. 1 may also or alternatively support other Authentication, Authorisation and Accounting (AAA) protocols including for example DIAMETER.

FIG. 2 illustrates a typical message sequence for EAP based authentication. Referring to FIG. 2, the mobile device 2 sends and receives EAP request/response messages over 802.11 frames, with the wireless AP 4 encapsulating and decapsulating these EAP messages to/from RADIUS messages that are sent to and received from the home RADIUS server 6. The home radius server 6 either authenticates the mobile device 2 locally, if it is responsible for the appropriate network domain, or it may forward the EAP/RADIUS request/response packets to a trusted remote RADIUS server 8.

FIGS. 1 and 2 illustrate an example EAP authentication arrangement and message sequence for wireless internet access, but it will be appreciated that EAP may be used in both wired and wireless networks and for mobile broadband access, for example over $3^{rd}$ Generation Partnership Project (3GPP) networks. Standards bodies such as the WiFi Alliance continue to develop procedures involving EAP authentication with the aim of improving key performance parameters including network performance and user experience.

A mobile device may have a choice of Access Points or other authenticators via which it may connect to a network. Additionally, a single mobile device may be programmed with multiple identities and associated credentials corresponding to different network domains, network slices or other divisions of the network. A mobile device may therefore be faced with a choice between different authenticators and different identities which it may use to seek to connect to a network. The device has no way of knowing which parts of the network an authenticator may be able to provide access to, as the device cannot know which remote servers a home server, corresponding to an authenticator, may be paired with. The device does not therefore know which of the different identities it may be programmed with it should use with a given authenticator, or, if seeking to use a particular identity, which authenticator it should seek connection through. Additionally, with different EAP methods being supported by different authentication servers, the mobile device has no way of knowing which EAP methods are supported by the home server of an authenticator, and by any remote servers with which the home server may be paired. This problem may be exacerbated if, for example, different identities and associated credentials programmed in a mobile device are for use with different EAP methods. As an example, a mobile device may have a first identity and credentials from remote RADIUS server 1 (supporting certificate authentication) and a second identity and credentials from remote RADIUS server 2 (supporting pre-shared key (PSK) authentication), with RADIUS server 1 being paired with a home RADIUS server but not RADIUS server 2. The device has no way of knowing which remote RADIUS servers are paired with the home RADIUS server, and so may seek to use the second identity, which the home RADIUS server is not capable of authenticating as it is not paired with RADIUS server 2.

According to existing protocols, an EAP method is proposed by the RADIUS server based on the identity provided by the mobile device, and it is then for the device to decide if it can authenticate itself using this method. If the device does not support this method, or does not have credentials for this method, then it will send a (legacy) NAK containing an EAP method suggestion from the device, as shown in the message sequence of FIG. 3. If the mobile device is roaming, and thus requires authentication by a remote RADIUS server, significant delays may be encountered as a consequence of the unreliable nature of the User Datagram Protocol (UDP), over which RADIUS messages are typically sent. Thus a mobile device may experience a delay before receiving a proposed EAP method, which it may or may not support. If the device cannot authenticate itself using the proposed method, it has to send a NAK. If a RADIUS server supports multiple EAP methods and credential types, then it may propose an alternative method after receiving a NAK from the device, leading to further delays and with no way of knowing whether a method which is also supported by the device will eventually be proposed.

The above discussed issues can lead to a degraded user experience, notably as a consequence of the delay caused by multiple attempts to connect to a network. In constrained devices such as sensors and actuators, battery drainage caused by the additional message exchanges required for multiple connection attempts can also become a significant problem. However, in such devices, iterative trial and error may be the only option for establishing network connection, as without appropriate user interfaces, automatic access point discovery and connection is a operating requirement of the device.

SUMMARY

It is an aim of the present invention to provide methods, apparatus and computer readable media which at least partially address one or more of the challenges discussed above.

According to a first aspect of the present invention, there is provided a method, performed by an Extensible Authentication Protocol (EAP) authenticator in a communication network. The method comprises obtaining an identification of at least one EAP method supported by an EAP authentication server providing an EAP authentication service to the EAP authenticator, wherein the identification is obtained from a network entity of the communication network or from inspection of traffic through the EAP authenticator, and providing the identification of at least one EAP method to a device operable to request communication network access from the EAP authenticator.

Examples of EAP methods which may be supported by an EAP authentication server include methods defined in Internet Engineering Task Force (IETF) Request for Comments (RFC) documents.

According to examples of the invention, obtaining the identification of at least one EAP method supported by the EAP authentication server providing the EAP authentication service to the EAP authenticator may comprise inspecting device access requests submitted to the EAP authenticator, determining which access requests are successfully authenticated, and saving the EAP methods used in the determined successfully authenticated access requests to a list. The parts of the network accessed during the successful authentications may also be saved to a list, with the corresponding EAP methods used.

According to examples of the invention, obtaining the identification of at least one EAP method supported by the EAP authentication server providing the EAP authentication service to the EAP authenticator may comprise sending a request to the network entity for identification of EAP methods supported by the EAP authentication server, and receiving from the network entity a response identifying at least one EAP method supported by the EAP authentication server.

According to examples of the invention, the EAP authentication server may comprise a home EAP authentication server, and the response from the network entity may further identify any EAP methods supported by remote EAP authentication servers trusted by the home EAP authentication server. In examples of the invention, a trust relationship between authentication servers is defined in each server's security policy. Security policies are predefined by each server's administrator, and often involve business relations between the operators of the servers. The most common security policy is a list of allowed servers or users (or a list of denied servers or users). A trust relationship between EAP authentication servers may be established through a peer relationship, which may for example be managed by communication network operators of the home and/or remote EAP authentication servers.

According to examples of the invention, the network entity may comprise the EAP authentication server. The EAP authenticator may thus query a home EAP authentication server for supported EAP methods, which may include EAP methods supported by trusted peer authentication servers.

According to examples of the invention, the network entity may comprise a network entity other than an EAP authentication server. The network entity other than an EAP authentication server may for example comprise a management node such as a configurations management server or a device management server.

According to examples of the invention, obtaining an identification of at least one EAP method supported by an EAP authentication server providing an EAP authentication service to the EAP authenticator may comprise selecting a part of the communication network to be accessed, sending to the EAP authentication server an access request for the selected part of the communication network using an identity, receiving a message from the EAP authentication server proposing an EAP method for the identity, and saving the EAP method to a list. The identity may for example be an identity of a device requesting communication network access, or may be in a format used by a device operable to request communication network access from the EAP authenticator. The message received from the EAP authenticator may be an EAP-Request message. In some examples of the invention, the selected part of the communication network and the identity may be associated to construct a Network Access Identity (NAI). In further examples, the steps of selecting a part of the communication network, sending an access request, receiving a message and saving the proposed EAP method may be repeated, for example selecting a new part of the network with each repetition. In this manner, according to examples of the invention, the EAP authenticator may build up a list of supported EAP methods. If the EAP authentication server is a home EAP authentication server, the received messages may include EAP methods supported by remote EAP authentication servers trusted by the home EAP authentication server.

According to examples of the invention, selecting a part of the communication network to be accessed may comprise at least one of selecting a communication network domain associated to a specific EAP method in a standard document, selecting a communication network domain configured in the EAP authenticator as supported by the EAP authentication server, or selecting a communication network domain to which a device has successfully connected via the EAP authenticator in the past.

According to examples of the invention, the identity may comprise an EAP status check identity, which may be reserved for the obtaining of identification of EAP methods supported in an EAP application server. In some examples, the status check identity may be recognised by the EAP authentication server as being reserved for the obtaining of identification of supported EAP methods, the server may therefore refrain from creating a state for the received request using the status check identity.

According to examples of the invention, providing the identification of at least one EAP method to a device operable to request communication network access from the EAP authenticator may comprise broadcasting the identification of at least one EAP method.

According to examples of the invention, broadcasting the identification of at least one EAP method may comprise including the identification of at least one EAP method in a beacon broadcast according to IEEE 802.11.

According to examples of the invention, providing the identification of at least one EAP method to a device operable to request communication network access from the EAP authenticator may comprise including the identification of at least one EAP method in a probe response, which may be sent in response to a probe request received from the device operable to request communication network access.

According to examples of the invention, providing the identification of at least one EAP method to a device operable to request communication network access from the EAP authenticator may comprise including the identification of at least one EAP method in vendor specific signalling.

According to examples of the invention, providing the identification of at least one EAP method to a device operable to request communication network access from the EAP authenticator may comprise including the identification of at least one EAP method in control or data signalling.

According to examples of the invention, providing the identification of at least one EAP method to a device operable to request communication network access from the EAP authenticator may comprise providing a compressed representation of the identification of at least one EAP method. The compressed representation may for example be a binary representation such as bloom filter.

According to examples of the invention, the method may further comprise obtaining an indication of a part of the communication network which may be accessed using the identified supported at least one EAP method, wherein the indication is obtained from the network entity of the communication network or from inspection of traffic through the EAP authenticator.

According to examples of the invention, the part of the network may comprise at least one of a network domain or a network slice.

According to examples of the invention, the indication of a part of the communication network which may be accessed using the identified supported at least one EAP method may match each identified supported EAP method to a part of the communication network which may be accessed using that identified supported EAP method.

According to examples of the invention, the method may further comprise providing the indication of a part of the communication network which may be accessed using the identified supported at least one EAP method to the device operable to request communication network access from the EAP authenticator.

According to examples of the invention, providing the indication of a part of the communication network which may be accessed using the identified supported at least one EAP method to the device operable to request communication network access from the EAP authenticator may comprise broadcasting the indication of a part of the communication network which may be accessed using the identified supported at least one EAP method. The indication may for example be included in a beacon broadcast according to IEEE 802.11.

According to examples of the invention, providing the indication of a part of the communication network which may be accessed using the identified supported at least one EAP method to the device operable to request communication network access from the EAP authenticator may comprise including the indication in a probe response, which may be sent in response to a probe request received from the device operable to request communication network access.

According to examples of the invention, providing the indication of a part of the communication network which may be accessed using the identified supported at least one EAP method to the device operable to request communication network access from the EAP authenticator may comprise including the indication in vendor specific signalling.

According to examples of the invention, providing the indication of a part of the communication network which may be accessed using the identified supported at least one EAP method to the device operable to request communication network access from the EAP authenticator may comprise including the indication in control or data signalling.

According to examples of the invention, various combinations may be envisaged for provision of supported EAP methods and corresponding parts of the communication network which may be accessed using the supported methods. For example, one or more supported EAP methods may be included in a beacon broadcast with corresponding parts of the network provided in a probe response, or, if the payload of the beacon broadcast is sufficient, both supported EAP methods and corresponding parts of the network may be included in the broadcast beacon. This may be particularly appropriate in a 5G context, in which a device may be seeking to connect to a particular network slice, and may listen to network broadcasts to identify a broadcast with support for the slice it requires.

According to examples of the invention, the EAP authenticator may comprise at least one of a wireless Access Point (AP) a Mobility Management Entity (MME), a Slice Selection Function (SSF), and/or a 3GPP basestation. The 3GPP basestation may for example be an enhanced NodeB or a 5G basestation.

According to examples of the invention, the EAP authentication server may comprise at least one of a RADIUS server, a DIAMETER server, or a 3GPP Authentication, Authorisation, Accounting, AAA, server. In examples of the invention, the 3GPP AAA server may be a Home Subscriber Service (HSS).

According to examples of the invention, the device may comprise at least one of an 802.11 station (STA), a 3GPP user equipment (UE), and/or a wireless device based on radio access technology other than 3GPP. In examples of the invention, the other radio access technology may be Blueooth, Zigbee, Thread etc.

According to another aspect of the present invention, there is provided a method, performed in an Extensible Authentication Protocol (EAP) authentication server in a communication network. The method comprises receiving a request for identification of EAP methods supported by the EAP authentication server, and sending a response to the request identifying at least one EAP method supported by the EAP authentication server.

According to examples of the invention, the request may be received from an EAP authenticator.

According to examples of the invention, the request may be received from another EAP authentication server trusted by the EAP authentication server.

According to examples of the invention, the method may further comprise forwarding the request to another EAP authentication server trusted by the EAP authentication server.

According to examples of the invention, the method may further comprise receiving a response to the forwarded request and forwarding the response to the originator of the request. In some examples, the EAP authentication server may assemble the supported EAP methods in response(s) received from its trusted server(s) together with its own supported EAP method or methods and send all of the supported EAP methods in a single response. Alternatively, the EAP authentication server may simply forward responses as it receives them.

According to examples of the invention, the request for identification of EAP methods supported by the EAP authentication server may include an identity and a part of the communication network to be accessed, and sending a response to the request identifying at least one EAP method supported by the EAP authentication server may comprise sending a message proposing an EAP method for the received identity.

According to examples of the invention, the identity may comprise an EAP status check identity, which may be reserved for the obtaining of identification of EAP methods supported in an EAP authentication server, and, on receipt of the request including the status check identity, the EAP authentication server may refrain from creating a state for the request.

According to examples of the invention, the request for identification of EAP methods supported by the EAP authentication server may include a request for an indication of a part of the communication network which may be accessed using the identified supported methods, and sending a response to the request identifying the at least one EAP method supported by the EAP authentication server may further comprise including in the response an indication of a part of the communication network which may be accessed using the identified supported at least one EAP method.

In some examples, the part of the network may comprise a network domain or a network slice, and the response may match each individual EAP method with the domain or slice which may be accessed using that EAP method. The included request for an indication of a part of the communication network may be forwarded to trusted EAP authentication servers, with the corresponding response being forwarded to the originator of the request.

According to another aspect of the present invention, there is provided a computer program configured, when run on a computer, to carry out a method according to either of the preceding aspects of the present invention.

According to another aspect of the present invention, there is provided a computer program product comprising computer readable medium and a computer program according to the preceding aspect of the invention stored on the computer readable medium.

According to another aspect of the present invention, there is provided an Extensible Authentication Protocol (EAP) authenticator, the EAP authenticator comprising a processor and a memory, the memory containing instructions executable by the processor, such that the EAP authenticator is operable to carry out a method according to the first aspect of the present invention.

According to another aspect of the present invention, there is provided an Extensible Authentication Protocol (EAP) authentication server, the EAP authentication server comprising a processor and a memory, the memory containing instructions executable by the processor, such that the EAP authentication server is operable to carry out a method according to the second aspect of the present invention.

The processors of the EAP authenticator and EAP authentication server may be any combination of one or more of a suitable central processing unit (CPU), multiprocessor, microcontroller, digital signal processor (DSP), application specific integrated circuit (ASIC) etc., capable of executing software instructions contained in a computer program such as that of the third aspect of the present invention, stored in a computer program product such as that of the fourth aspect of the present invention.

BRIEF DESCRIPTION OF THE DRAWINGS

For a better understanding of the present invention, and to show more clearly how it may be carried into effect, reference will now be made, by way of example, to the following drawings in which:

FIG. 6 is a representation of an EAP-Status Request packet;

FIG. 7 is a representation of an EAP-Status Response packet;

DETAILED DESCRIPTION

Aspects of the present invention provide methods according to which an EAP authenticator may obtain an identification of an EAP method or methods supported by an EAP authentication server providing authentication services to the authenticator, and may then provide this indication to a device operable to request communication network access from the EAP authenticator. In examples of the invention, the EAP authenticator and associated home and remote authentication servers may pre-negotiate, or otherwise establish all the EAP methods supported by them. In further examples, the EAP authenticator may inspect successful access requests to identify and store EAP methods which were used for successful authentications and parts of the network accessed during the successful authentications. The authenticator may then provide information about supported EAP methods to devices, for example by broadcasting it in 802.11 beacon transmissions or by including it as a part of probe responses, vendor specific messages or other control or data transmissions. Information about supported EAP methods, together for example with information about network domains or network slices for which the RADIUS servers are responsible, can also be communicated to devices for example in appropriate 802.11 MAC frames such as the probe response frame.

Figure 1:
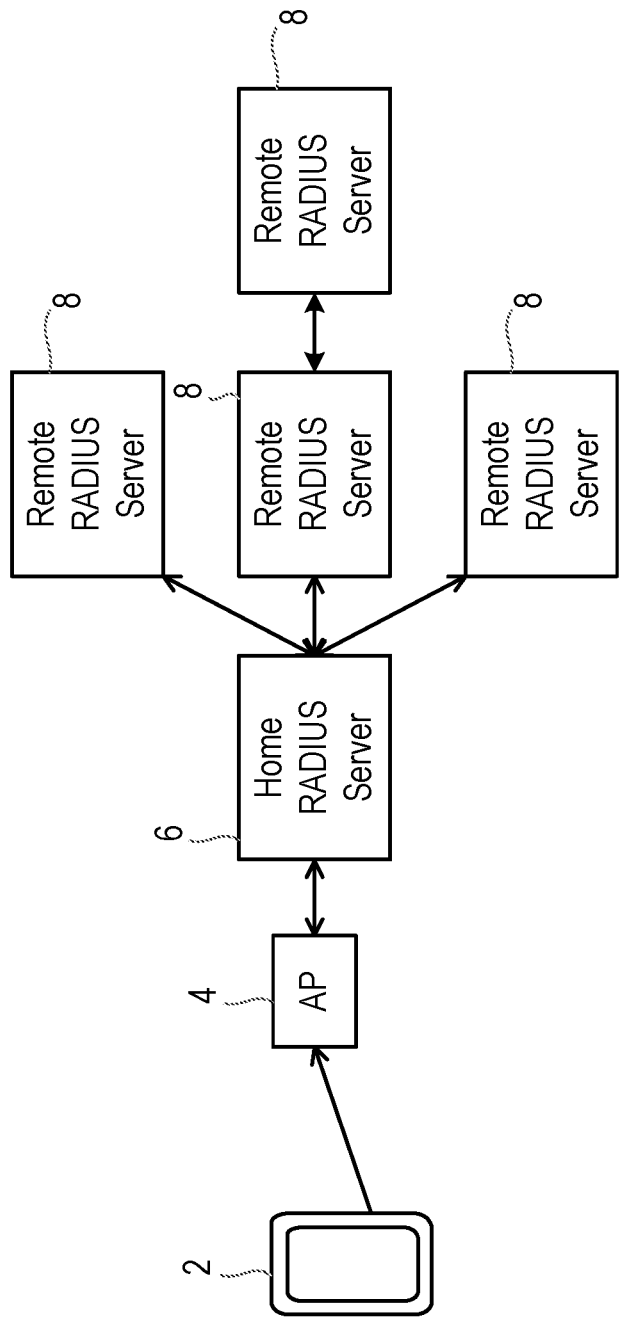
FIG. 1 illustrates an arrangement for IEEE 802.1X enterprise authentication.
Figure 2:
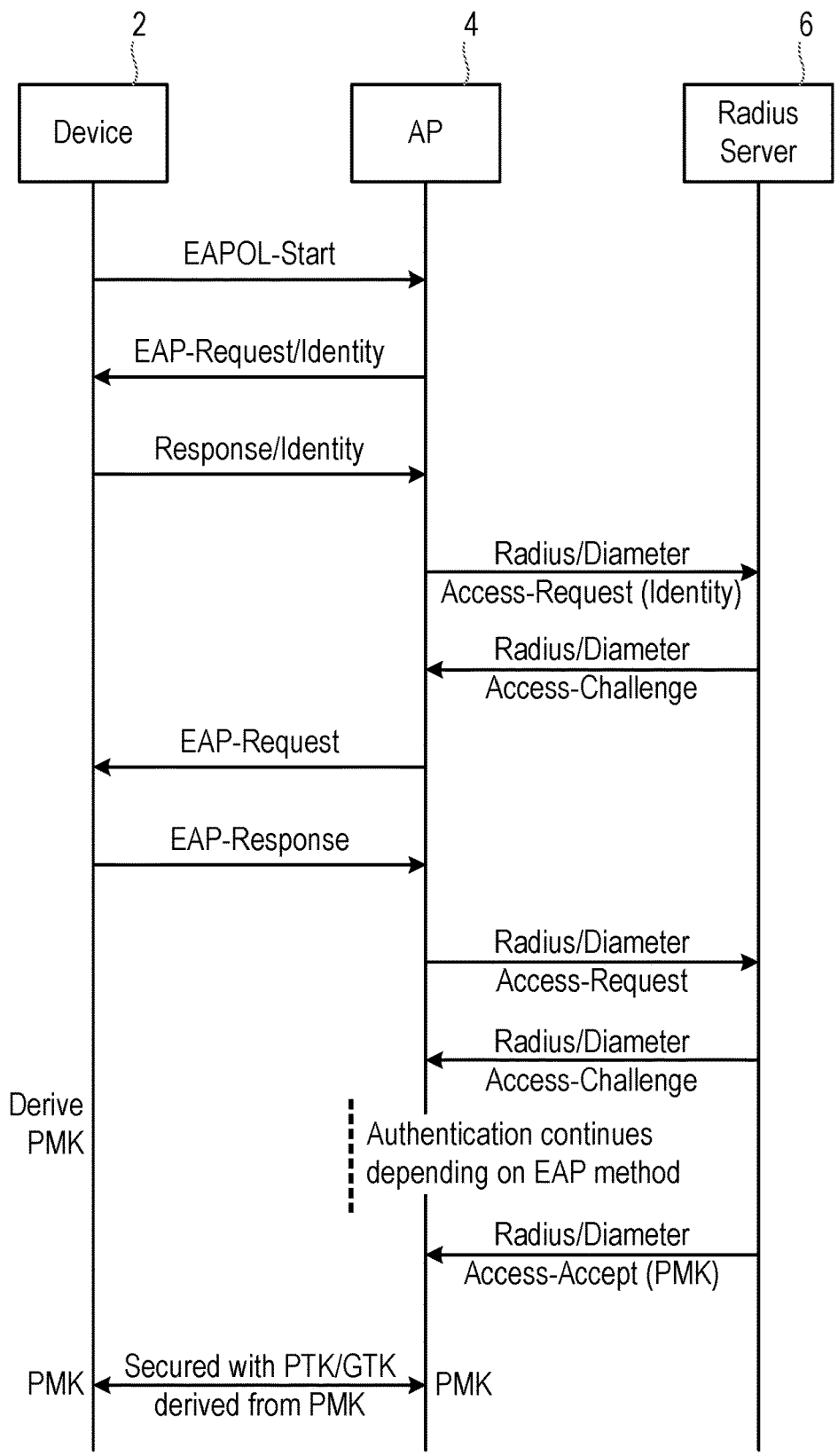
FIG. 2 illustrates a message sequence for EAP based authentication.
Figure 3:
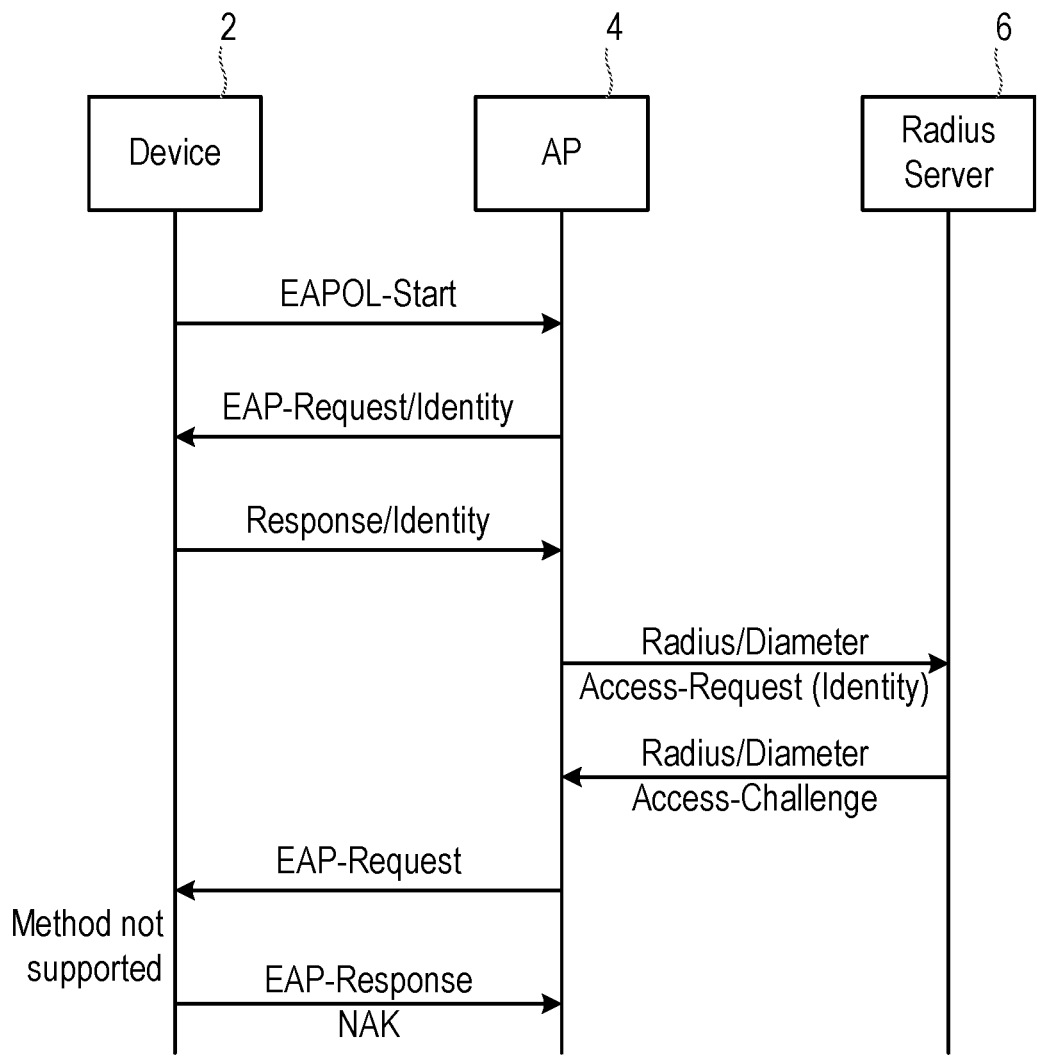
FIG. 3 illustrates a message sequence when a proposed EAP method is not supported by the requesting mobile device.
Figure 4:
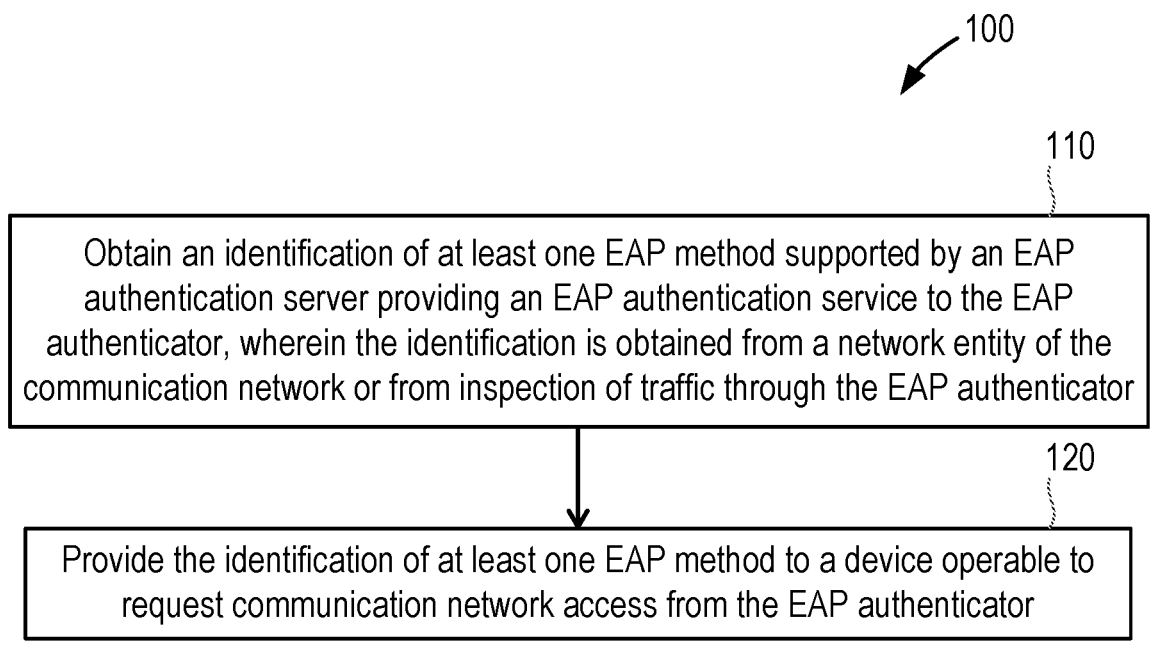
FIG. 4 is a flow chart illustrating process steps in a method performed in an EAP authenticator.

FIG. 4 illustrates a first example method 100 conducted in an EAP authenticator of a communication network. This may for example be a wireless Access Point (AP) in a wireless internet implementation, or may be a 3GPP Mobility Management Entity (MME), a Slice Selection Function or a 3GPP basestation, such as an evolved NodeB or a 5G NodeB, in a mobile broadband implementation. In a first step 110, the EAP authenticator obtains an identification of at least one EAP method supported by an EAP authentication server providing an EAP authentication service to the EAP authenticator. This may be obtained from a network entity in the communication network or from inspection of traffic through the EAP authenticator. In a second step 120, the EAP authenticator provides the identification of at least one EAP method to a device operable to request communication network access from the EAP authenticator. The network entity from which the EAP authenticator may obtain the identification of supported EAP method or methods may be the EAP authenticator itself, for example a RADIUS or DIAMETER server or a 3GPP AAA server. Alternatively, the network entity may be another network entity, which may cooperate with the EAP authentication server to establish supported EAP methods and may then provide this information to the EAP authenticator. The step of providing the identification to a device operable to request communication network access from the EAP authenticator may comprise including the identification in a broadcast or signalling to the device. Each of these options is discussed in greater detail below with reference to FIG. 5.

Figure 5:
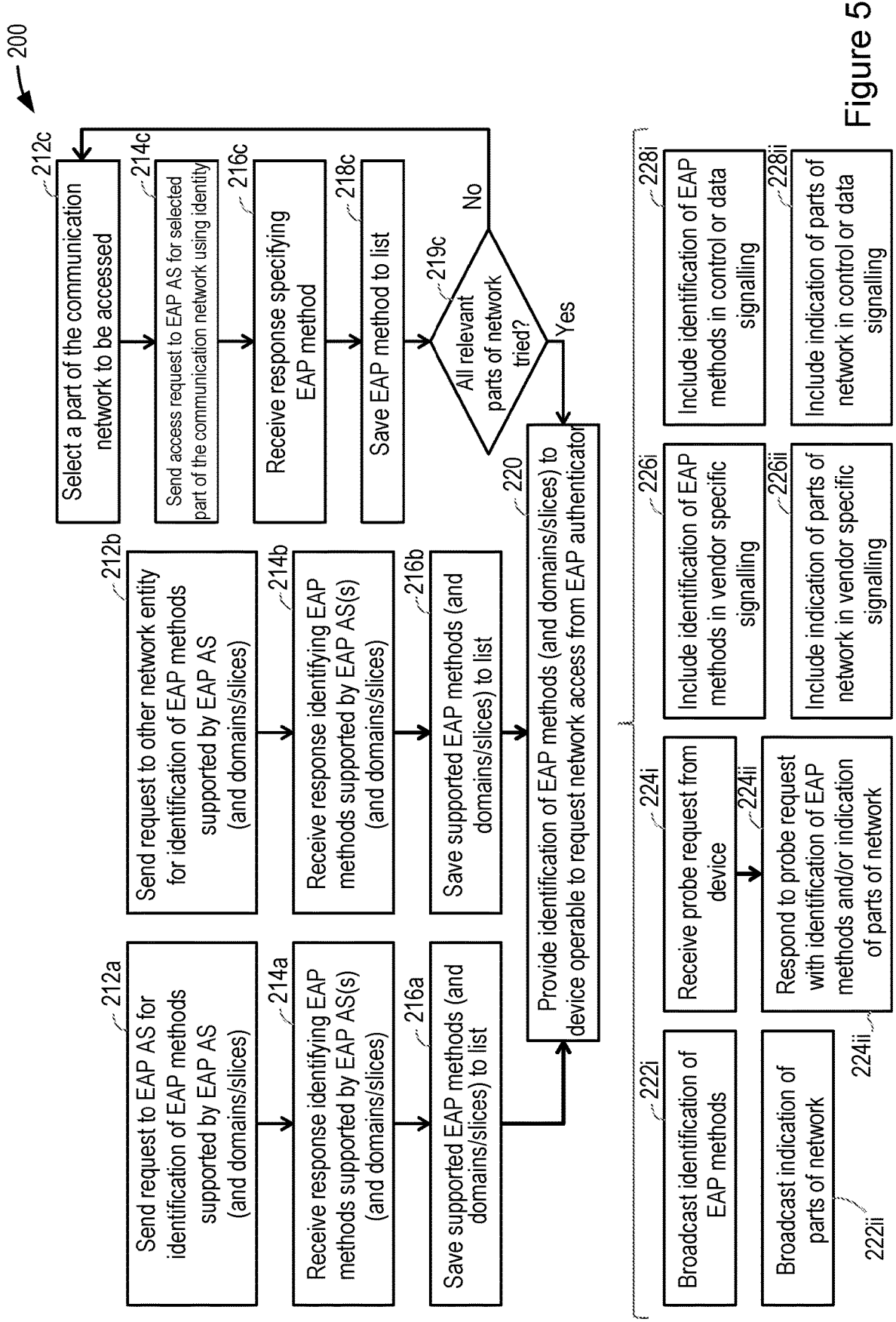
FIG. 5 is a flow chart illustrating process steps in another example of a method performed in an EAP authenticator.

FIG. 5 illustrates another example method 200 conducted in an EAP authenticator of a communication network. FIG. 5 provides one example of how the steps of method 100 in FIG. 4 may be subdivided and supplemented to provide the functionality discussed above. As noted above with reference to FIG. 4, there are different ways in which the EAP authenticator may obtain the indication of at least one supported EAP method. FIG. 5 illustrates three alternatives as streams a, b and c. In a first alternative a, the EAP authenticator sends a request to its home EAP authentication server in step 212a for identification of EAP methods supported by the server. The request may also request the parts of the network, for example network domains or network slices, for which the server is responsible. In step 214a, the EAP authenticator receives a response identifying any and all EAP methods supported by the server, and which may also identify the parts of the network for which it is responsible. The response may match each supported method to those parts of the network which the supported method can be used to access. If the home EAP authentication server is paired with or has established trust with other remote EAP authentication servers, then the home EAP authentication server may include the EAP methods supported by its paired remote servers, as well as the parts of the network for which they are responsible. This is discussed in further detail below with reference to FIG. 9.

As an example, the EAP authentication server might reply with:
<EAP-PSK: example.com, organization.org>
<EAP-TLS: identity-provider.net>
This response would indicate that either the server itself or trusted paired servers support EAP method PSK for the network domains example.com and organization.org, and EAP method TLS for the network domain identity-provider.net. The response received from the EAP authentication server may not specify which methods/parts of the network are supported by which EAP authentication server, as the EAP authenticator does not need this information. All requests are routed through the home EAP authentication server, which is then responsible for identifying and routing the request to the appropriate server to handle the request. The identification of supported EAP methods, and domain/network slice information if provided, are saved by the authenticator to a list in step 216a, ready to be provided to devices operable to request communication network access.

In some examples of the invention, new RADIUS packets may be defined for querying supported EAP methods and associated parts of the network. Examples of these new packets are illustrated in FIGS. 6 and 7. FIG. 6 illustrates a RADIUS EAP-Status request packet, including a 16 octet field for containing the request. FIG. 7 illustrates a RADIUS EAP-Status response packet, containing a list of supported EAP methods and parts of the network. If many EAP methods and/or network domains/network slices are supported, then several message exchanges may be conducted in order to generate a complete list in the EAP authenticator of all supported EAP methods and parts of the network. In further examples of the invention, existing RADIUS Server-Status and Access-Accept/Access-Challenge or Access-Response packets may be used to convey the appropriate information.

Referring again to FIG. 5, in another alternative b, the EAP authenticator may send a request to another network entity in step 212b for identification of EAP methods supported by the EAP authentication server of the EAP authenticator. As in alternative a, the request may also request the parts of the network, for example network domains or network slices, for which the server is responsible. In step 214b, the EAP authenticator receives a response identifying any and all EAP methods supported by the server, and which may also identify the parts of the network for which it is responsible. As in alternative a, if the home EAP authentication server is paired with or has established trust with other remote EAP authentication servers, then the EAP methods supported by its paired remote servers, as well as the parts of the network for which they are responsible may be included in the request. Supported EAP methods and corresponding parts of the network are then stored in a list by the EAP authenticator in step 216b. It will be appreciated that in alternative b, substantially equivalent steps are performed by the EAP authenticator to those in alternative a, with message exchanges simply taking place between the EAP authenticator and a different network entity to the EAP authentication server. This may be appropriate for example if the EAP authentication server does not support a request for supported EAP methods. In such cases, another network entity may be programmed with this information or may compile this information, for example through trial and error or other message exchanges with the EAP authentication server.

Referring again to FIG. 5, in another alternative example c, the EAP authenticator may iteratively compile a list of supported EAP methods by repeatedly querying the EAP authentication server. The EAP authenticator may initially select a part of the communication network for which access is to be requested in step 212c. In a first example, this may comprise selecting a communication network domain associated to a specific EAP method in a standard document. Access to certain domains is standardised and thus the EAP method for accessing such domains may be obtained from the appropriate standard document. Alternatively, the EAP authenticator may select a communication network domain configured in the EAP authenticator as served by the EAP authentication server, as the network administrator for the EAP authenticator may be aware of domains served by both the home and trusted remote EAP authentication servers of the EAP authenticator. In another example, the EAP authenticator may select a communication network domain to which a device has successfully connected via the EAP authenticator in the past. The EAP authenticator would thus learn from inspection the communication network domains which are serviced by its home and remote EAP authentication servers.

Having selected a communication network domain, the EAP authenticator then sends an access request to its home EAP authentication server in step 214c requesting access to the selected domain with an identity. This identity may for example be a status check identity, which is recognised by the EAP authentication server as being reserved for the checking of supported EAP methods. The EAP authenticator may associate the status check identity with the selected domain to construct a Network Access Identity (NAI) such as "status-check@slected-domain.com", which NAI is submitted to the home EAP authentication server in the access request.

The EAP authenticator receives a response to the request in step 216c, the response proposing at least one EAP method for the identity and domain. It may be that the EAP authentication server is programmed to recognise the status check identity as valid for all of its served domains and for all EAP methods supported for each domain. The response may therefore propose all EAP methods supported for the selected domain. Multiple supported EAP methods may be communicated for example using an EAP Status response packet as described above, or via multiple standard EAP response messages, one EAP response message for each supported EAP method. The or each proposed EAP method is saved to a list in step 218c, together with the selected domain, and in step 219c, the EAP authenticator checks whether other domains may be selected. This may include for example checking whether access to all domains programmed as being served by the EAP authentication server has been requested, or whether access to all domains which have been successfully accessed via the EAP authenticator in the past has been requested. If all relevant domains have not yet been tried, the EAP authenticator repeats the steps 212c to 219c, until an access request using the identity for all relevant domains has been sent and responded to, allowing the construction of a list of supported EAP methods and corresponding communication network domains. By obtaining a list of all supported EAP methods for all domains which can be accessed via the EAP server, a complete list of all supported EAP methods and domains may be established.

In a variation of alternative c, the EAP authenticator may receive a message proposing only a single supported EAP method for the selected domain. The EAP authenticator may not know whether this represents the only supported EAP method for the domain or whether other EAP methods may be supported for the domain. In such a situation, the EAP authenticator may reject the proposed EAP method and suggest an alternative EAP method. The EAP authenticator may in this manner propose an EAP method in order to determine whether that method is supported by the EAP authentication server for the selected domain. If the EAP authentication server accepts the suggested EAP method, the EAP authenticator may terminate the authentication run and initiate a new run to continue polling for supported methods. Alternatively, the EAP authenticator may reject the now accepted EAP method that it previously suggested and suggest a new method, in order to check support for all EAP methods in the selected domain. In a still further alternative, the status check identity may be adapted or changed with each request, or with each new selected domain.

In a further alternative d, not illustrated in FIG. 5, the EAP authenticator may inspect traffic flowing through the EAP authenticator, in order to monitor access requests received from devices. The EAP authenticator may determine which access requests are successfully authenticated and identify the EAP method or methods used in the successfully authenticated requests. The EAP authenticator may also identify the parts of the network accessed, for example via extracting the successfully used NAI, including both a device identity and a network domain. The EAP authenticator may then save the identified EAP method and network domain to a list of supported EAP methods and domains. Through continual inspection of received network access requests, the EAP authenticator may thus build up a list of EAP methods which have been successfully used for authentication, and which are supported by either a home or remote EAP authentication server of the EAP authenticator.

Alternatives a, b, c and d are merely examples of different ways in which the EAP authenticator may obtain an identification of EAP methods supported by an EAP authentication server which provides EAP authentication services to the EAP authenticator. Regardless of the manner in which this identification is obtained, the method 200 then comprises providing the identification of supported EAP methods to a device operable to request communication network access from the EAP authenticator in step 220. This step may also include providing information on the parts of the network, for example network domains or network slices, which can be accessed using the supported methods.

As for the previous step of obtaining the identification of supported EAP methods, the step of providing the obtained indication to a device operable to request network access from the EAP authenticator may be achieved in a variety of different ways, examples of which are illustrated as steps 222 to 228 in FIG. 5. In a first example, the identification of EAP methods may be broadcast by the EAP authenticator in step 222i. The information may for example be included in beacon frames of an 802.11 broadcast. The beacon frames may only contain a list of supported EAP methods or, in some examples, the parts of the network which may be accessed may also be included in a broadcast in step 222ii. In some examples, supported EAP methods may be included in broadcast beacon frames in a simple sting format, for example: "EAP-TLS,EAP-PSK,EAP-TTLS(EAP-GTC), EAP-AKA". Here the EAP method inside the parenthesis represents a supported phase 2 authentication method. In other examples, a compressed representation may be used to reduce the size of the information to be broadcast. A binary representation is one example, in which each '1' bit may indicate support for a specific EAP method, thus:

EAP-TLS corresponds to bit xxx1
EAP-PSK corresponds to bit xx1x
EAP-AKA corresponds to bit x1xx etc.

Using this representation, 0101 would indicate that both TLS and AKA are supported but PSK is not. There may in some examples be two such binary strings for phase 1 and phase 2 methods.

In another example, the identification of EAP methods may be included in a probe response message, which may be sent in step 224ii in response to a probe request message received from a mobile device in step 224i. The probe response message may include both supported EAP methods and corresponding parts of the network, or this information may be conveyed in several probe response messages. In another example, the identification of EAP methods may be included in vendor specific signalling in step 226i, and the parts of the network which may be accessed may also be included in vendor specific signalling in step 226ii. In another example, the identification of EAP methods may be included in control or data signalling in step 228i, and the parts of the network which may be accessed may also be included in control or data signalling in step 228ii.

It will be appreciated that various combinations of the above examples may be envisaged, for example depending upon the amount of information that is to be conveyed. For example, if only relative few EAP methods are supported by home and remote EAP authentication servers, all of the supported EAP methods together with the corresponding parts of the network which may be accessed may be included in a broadcast. In the event that this information is too large to fit into the beacon broadcast frames, only the EAP methods may be broadcast, with additional information regarding domains, network slices etc being provided in probe response, vendor specific signalling or control or data signalling. In one example, the EAP authenticator may include in a broadcast identification of EAP methods supported by the accepted EAP authentication servers including the home server and all trusted remote servers. If this information is not enough for the device, it may request additional information via a probe request, for example:
"ALL_DOMAINS_THAT_SUPPORT_EAP_TLS" or
"ALL_METHODS_SUPPRTED_BY_DOMAIN:
example.net".

The EAP authenticator may then answer this query in a probe-response message, enabling the device to obtain additional details about how and in what domain or network slice it can use certain credentials, identities and EAP methods. According to certain examples of the invention, a mobile device operable to request communication network access from an EAP authenticator may thus be able to determine whether or not it should try connecting to a particular EAP authenticator simply on the basis of that EAP authenticator's beacon message. If the device sees that it can use one of the EAP methods advertised, then it may ask for further information in a probe request. This request can be used to find out if one of the EAP authentication servers associated with the EAP authenticator is responsible for the domain or network slice the device is seeking to access.

Figure 8:
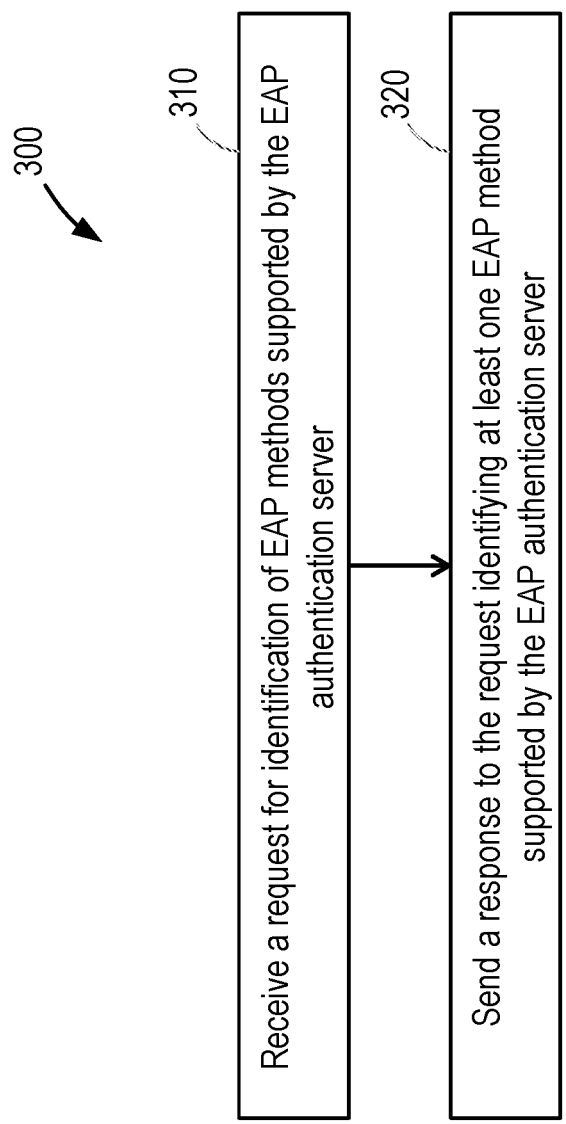
FIG. 8 is a flow chart illustrating process steps in a method performed in an EAP authentication server.

The methods 100, 200 described above and performed in an EAP authenticator may be complimented by methods performed in an EAP authentication server. FIG. 8 illustrates a first example of a method 300 performed in an EAP authentication server. The EAP authentication server may for example be a RADIUS or DIAMETER server or a 3GPP AAA server. Referring to FIG. 7, in a first step 310, the EAP authentication server receives a request for identification of EAP methods supported by the EAP authentication server. The request may be received from an EAP authenticator or from another EAP authentication server trusted by the EAP authentication server. In a second step 320, the EAP authentication server sends a response to the request identifying at least one EAP method supported by the EAP authentication server. The request for identification of EAP methods supported by the EAP authentication server may include a request for an indication of a part of the communication network which may be accessed using the identified supported at least one EAP method, and the response sent by the EAP authentication server may include an indication of a part of the communication network which may be accessed using the identified supported at least one EAP method. The different formats in which the EAP authentication server may respond to the request are discussed above, with reference to FIGS. 4 and 5.

Figure 9:
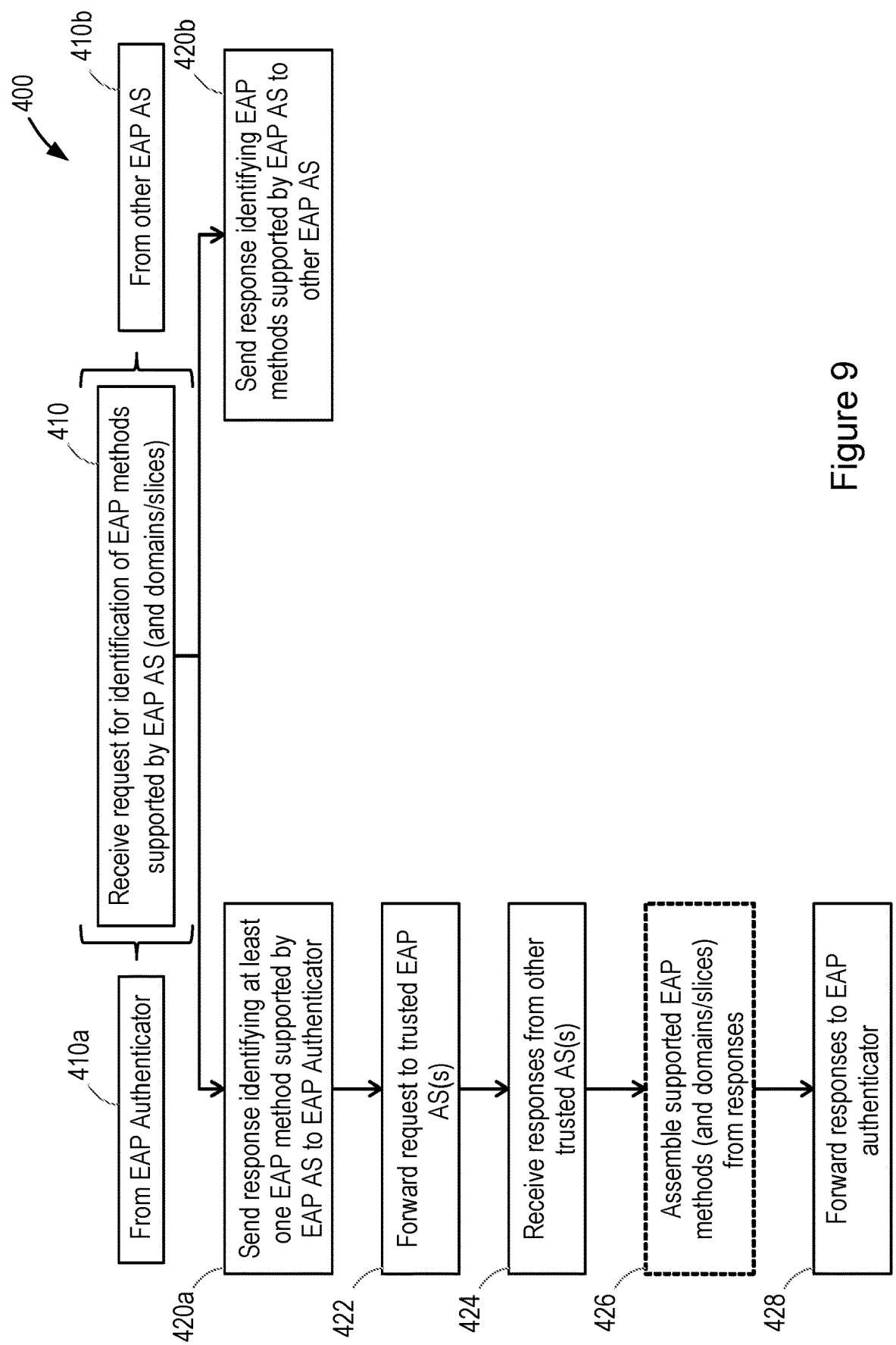
FIG. 9 is a flow chart illustrating process steps in another example of a method performed in an EAP authentication server.

FIG. 9 illustrates another example method 400 conducted in an EAP authentication server of a communication network. FIG. 9 provides one example of how the steps of method 300 in FIG. 8 may be subdivided and supplemented to provide the functionality discussed above. Referring to FIG. 9, in a first step 410, the EAP authentication server receives a request for identification of EAP methods supported by the EAP authentication server. As illustrated, the request may be received from an EAP authenticator in step 410a or from another EAP authentication server trusted by the EAP authentication server in step 410b. The request may include a request for an indication of a part of the communication network, for example network domain or network slice, which may be accessed using the EAP methods supported by the EAP authentication server. If the request is received from another trusted EAP authentication server, in step 410b, the EAP authentication server proceeds in step 420b to respond to the request with a response identifying at least one EAP method supported by the EAP authentication server, together with the part of parts of the network which may be accessed via the EAP authentication server using the supported method or methods, if this information is also requested. The response is sent back to the trusted EAP authentication server from which the request was received.

If the request is received from an EAP authenticator, in step 410a, the EAP authentication server sends a similar response to that described above but sends the response back to the EAP authenticator which sent the request in step 420a. The response identifies at least one EAP method supported by the EAP authentication server, together with the part of parts of the network which may be accessed via the EAP authentication server using the supported method or methods, if this information is also requested. The EAP authenticator also forwards the request to any other EAP authentication servers with which it has a trust relationship in step 422. This may include EAP authentication servers with which it has been paired by a network administrator. In step 424, the EAP authentication server receives responses from other trusted EAP authentication servers, and in step 426 the EAP authentication server may assemble a list of supported EAP methods and corresponding parts of the network from the received responses. In step 428, the EAP authentication server forwards the received responses to the EAP authenticator, or, if assembled, forwards the assembled list of supported EAP methods and parts of the network. The EAP authentication server may thus forward responses from trusted servers as and when they arrive, or may wait to assemble a full list of supported EAP methods and parts of the network before forwarding this information to the EAP authenticator.

In some examples, the EAP authentication server may receive an access request including both an identity and a part of the network to be accessed, wherein the identity comprises a status check identity. The status check identity may be programmed in the EAP authentication server as being for the purpose of checking supported EAP methods, and as supported for all domains served by the EAP authentication server and for all EAP methods supported for each domain. The EAP authentication server may therefore respond to the request with all EAP methods supported for the domain specified in the request, for example using multiple standard EAP responses or an EAP Status response packet as described above. The EAP authentication server may refrain from creating a state for the request, recognising that the status check identity in the request is exclusively reserved for checking supported EAP methods.

Figure 10:
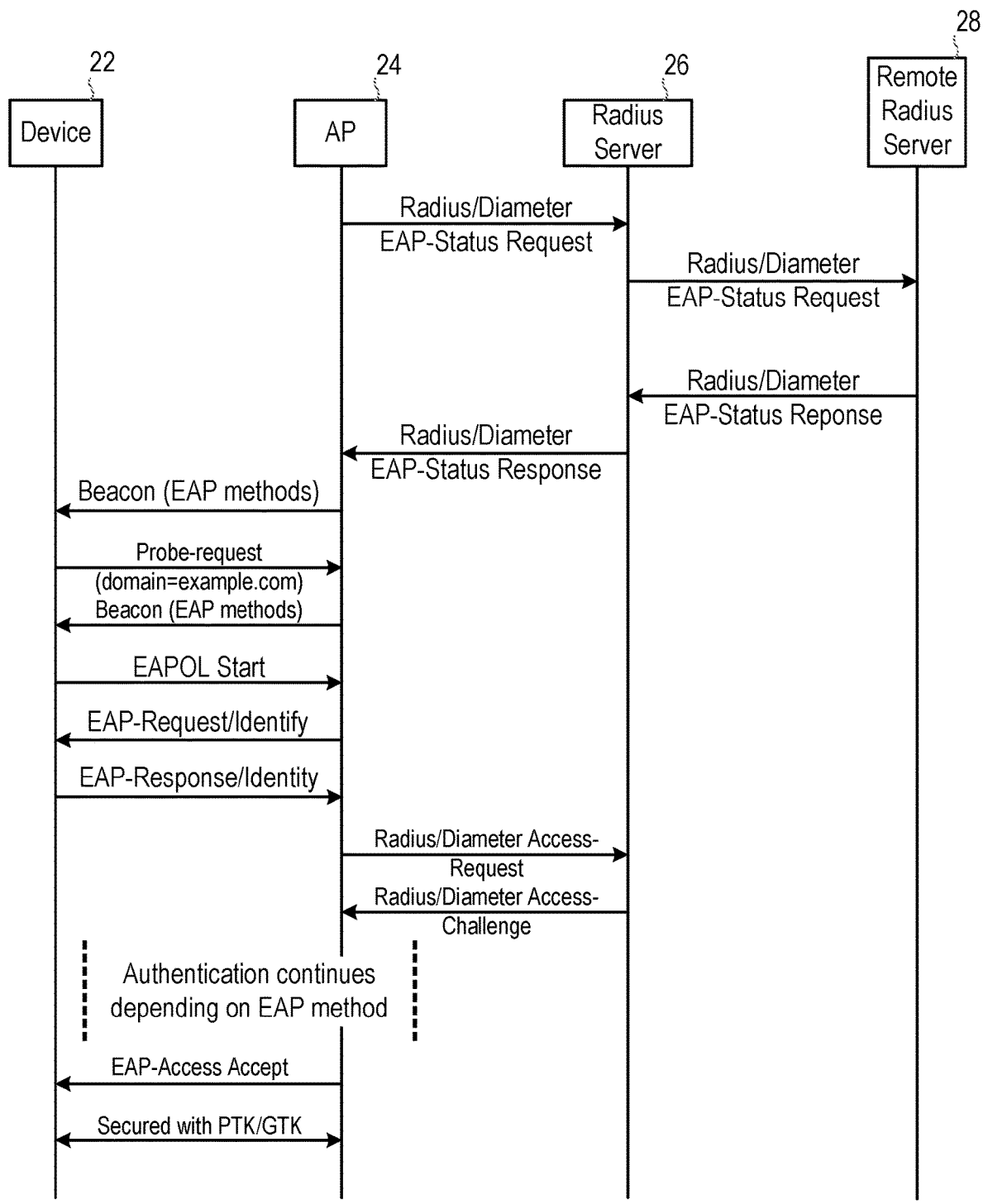
FIG. 10 illustrates a message sequence according to examples of the methods illustrated in FIGS. 4, 5, 8 and 9.

It will be appreciated that the above described example methods conducted in an EAP authenticator and an EAP authentication server cooperate to form a two stage process; a first stage in which the EAP authenticator obtains an indication of EAP methods supported by the EAP authentication server, and any trusted remote EAP authentication servers, and a second stage in which this information is conveyed to devices operable to request network connection from the EAP authenticator. This represents an example of the EAP authenticator methods in which the information about supported EAP methods is obtained directly from the relevant EAP authentication server. This process is illustrated in the example message sequence of FIG. 10. Referring to FIG. 10, the EAP authenticator, in the form of a wireless access point (AP) 24, sends a request to its home EAP authentication server in the form of RADIUS server 26, and asks it for all supported EAP methods using the EAP-Status request packet. The home RADIUS server 26 forwards the request to a paired remote server 28 and receives a response using the EAP-Status response packet. The home RADIUS server 26 forwards the received response, together with its own response, to the wireless AP, again using the EAP-Status response packet. The response includes a list of supported EAP methods and the domains or network slices which can be accessed using those methods. The wireless AP 24 includes the supported EAP methods in its beacon broadcast, which is received by wireless device 22. The wireless device 22 is seeking to access the network domain example.com, and sends a probe request asking which EAP methods can be used to access this domain. The AP 24 responds with the method or methods which may be used. This enables the device 22 to use an appropriate identity when requesting access, ensuring that the authentication process will proceed smoothly, with no need for repeated access attempts in order to find a suitable identity and AP combination.

The above described examples are discussed principally in the context of implementation in a wireless network operating according to IEEE 802.11 and 802.1X. It will be appreciated however that implementations in both wired and radio networks are also possible. For example, the above discussed methods may be implemented in a 3GPP 4G or 5G network, with a Mobility Management Entity (MME), Slice Selection Function (SSF) or evolved NodeB in the role of EAP authenticator, and AAA infrastructure in the network, or in each network slice or sub-slice, in the role of EAP authentication server. The AAA infrastructure may for example be implemented in a Home Subscriber Service (HSS). As described above, the EAP authenticator, being the MME, SSF or evolved NodeB, obtains identification of supported EAP methods and network domains or slices which may be accessed, and may include this information for example in radio network broadcasts. Network devices may then listen to such broadcasts and identify a broadcast with support for the network slice or domain to which it wishes to connect. The device may then have all the information required to select an appropriate identity and request network connection or may request additional detail from the appropriate authenticator.

Figure 11:
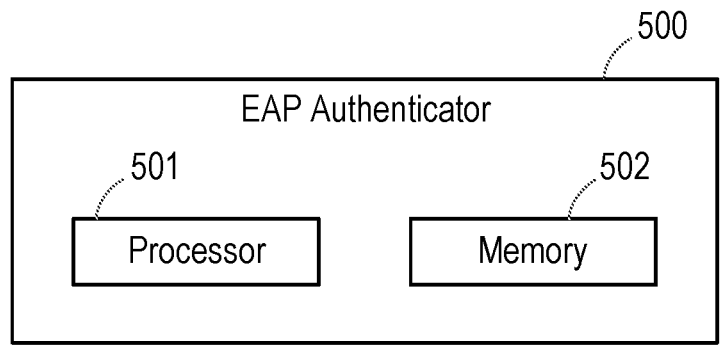
FIG. 11 is a block diagram illustrating functional elements in an EAP authenticator.
Figure 12:
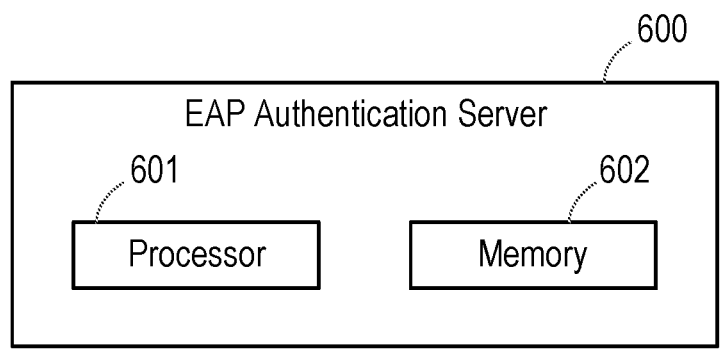
FIG. 12 is a block diagram illustrating functional elements in an EAP authentication server.

The methods of the present invention, as illustrated by the above examples, may be conducted in an EAP authenticator or an EAP authentication server. The methods may be conducted on receipt of suitable computer readable instructions, which may be embodied within a computer program running on the EAP authenticator or EAP authentication server. FIGS. 11 and 12 illustrate first examples of EAP authenticator and EAP authentication server which may execute the methods of the present invention, for example on receipt of suitable instructions from a computer program. Referring to FIGS. 11 and 12, each of the EAP authenticator 500 and EAP authentication server 600 comprises a processor 501, 601, and a memory 502, 602. The memory 502, 602 contains instructions executable by the processor 501, 601 such that the EAP authenticator 500 is operative to carry out examples of the methods 100, 200 and the EAP authentication server 600 is operative to carry out examples of the methods 300, 400. According to examples of the invention, the EAP authenticator 500 may comprise at least one of a wireless Access Point (AP) a Mobility Management Entity (MME), a Slice Selection Function (SSF), and/or a 3GPP basestation. The 3GPP basestation may for example be an enhanced NodeB or a 5G basestation. The EAP authentication server 600 may comprise at least one of a RADIUS server, a DIAMETER server, or a 3GPP Authentication, Authorisation, Accounting, AAA, server, such as for example a Home Subscriber Service (HSS). The device operable to request access may be an 802.11 station (STA), a 3GPP user equipment (UE), and/or a wireless device based on radio access technology other than 3GPP. In examples of the invention, the other radio access technology may be Blueooth, Zigbee, Thread etc.

Figure 13:
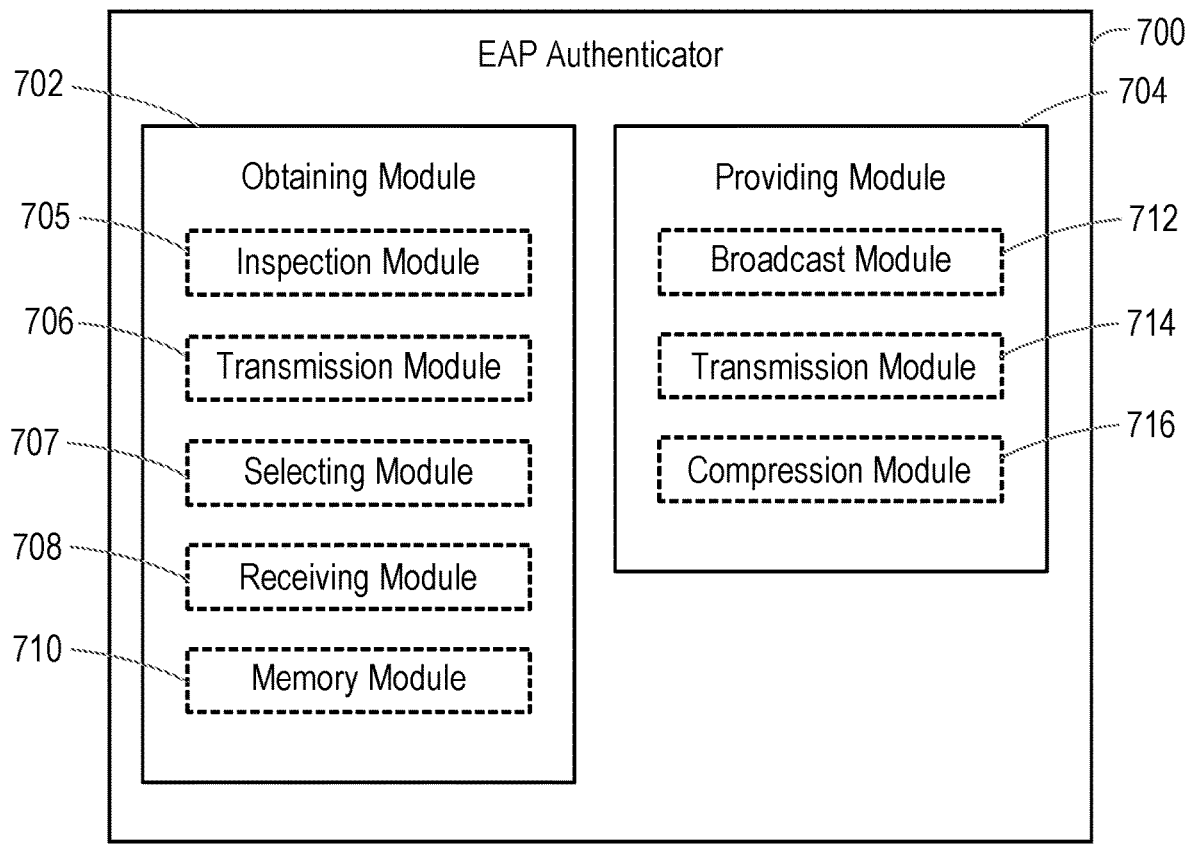
FIG. 13 is a block diagram illustrating functional elements in another example of EAP authenticator.

FIG. 13 illustrates functional units in another embodiment of EAP authenticator 700 which may execute the methods 100, 200 for example according to computer readable instructions received from a computer program. It will be understood that the units illustrated in FIG. 13 are software implemented functional units, and may be realised in any appropriate combination of software modules.

Referring to FIG. 13, the EAP authenticator 700 comprises an Obtaining module 702 for obtaining an identification of at least one EAP method supported by an EAP authentication server providing an EAP authentication service to the EAP authenticator, wherein the Obtaining module 702 obtains the identification from a network entity in the communication network or from inspection of traffic through the EAP authenticator 700. The EAP authenticator 700 also comprises a Providing module 704 for providing the identification of at least one EAP method to a device operable to request communication network access from the EAP authenticator.

The Obtaining module 702 may comprise an Inspection module 705 for inspecting device access requests submitted to the EAP authenticator and for determining which access requests are successfully authenticated. The Obtaining module may also comprise a Memory module 710 for saving the EAP method used in the determined successfully authenticated access requests to a list.

The Obtaining module 702 may comprise a Transmission module 706 for sending a request to the network entity for identification of EAP methods supported by the EAP authentication server, and a Receiving module 708 for receiving from the network entity a response identifying at least one EAP method supported by the EAP authentication server. The Transmission module 706 may be for sending the request to the EAP authentication server, or may be for sending the request to a network entity other than an EAP authentication server, including for example a management node. The Receiving module 708 may be for receiving a response from the EAP authentication server, or may be for receiving a response from the network entity other than an EAP authentication server. The EAP authentication server may be a home EAP authentication server, and the Receiving module 708 may also be for receiving an indication of EAP methods supported by remote EAP authentication servers trusted by the home EAP authentication server.

The Obtaining module 702 may comprise a Selecting module 707 for selecting a part of the communication network to be accessed, and the Transmission module 706 may be for sending to the EAP authentication server an access request for the selected part of the communication network using an identity. The Receiving module 708 may be for receiving a message from the EAP authentication server proposing an EAP method for the identity. The Memory module 710 may be for saving the proposed EAP method to a list. The identity may for example be an identity of a device requesting communication network access, or may be in a format used by a device operable to request communication network access from the EAP authenticator. The Selecting module 705, Transmission Module 706, Receiving module 708 and Memory module 710 may repeat the above discussed actions, for example on the basis of a different selected part of the network. In this manner, according to examples of the invention, the EAP authenticator 700 may build up a list of supported EAP methods for different parts of the network. If the EAP authentication server is a home EAP authentication server, the messages may include EAP methods supported by remote EAP authentication servers trusted by the home EAP authentication server.

The Selecting module 705 may be for selecting a part of the communication network to be accessed by performing at least one of selecting a communication network domain associated to a specific EAP method in a standard document, selecting a communication network domain configured in the EAP authenticator as supported by the EAP authentication server, or selecting a communication network domain to which a device has successfully connected via the EAP authenticator in the past.

According to examples of the EAP authenticator 700, the Providing module 704 may comprise a Broadcast module 712 for broadcasting the identification of at least one EAP method, for example by including the identification of at least one EAP method in a beacon broadcast according to IEEE 802.11. The providing module 704 may also comprise a Transmission module 714 for including the identification of at least one EAP method in a probe response, which may be sent in response to a probe request received from the device operable to request communication network access. The Transmission module 714 may also be for including the identification of at least one EAP method in vendor specific signalling or in control or data signalling. The Providing module 704 may also comprise a Compression module 716 for providing a compressed representation of the identification of at least one EAP method. The compressed representation may for example be a binary representation such as bloom filter.

The Obtaining module 702 may also be for obtaining an indication of a part of the communication network which may be accessed using the identified supported at least one EAP method, wherein the indication is obtained from the network entity of the communication network or from inspection of traffic through the EAP authenticator. The part of the network may comprise at least one of a network domain or a network slice. The Providing module 704 may be for providing the indication of a part of the communication network which may be accessed using the identified supported at least one EAP method to the device operable to request communication network access from the EAP authenticator.

The Broadcast module 712 may be for broadcasting the indication of a part of the communication network which may be accessed using the identified supported at least one EAP method, for example by including the indication in a beacon broadcast according to IEEE 802.11. The Transmission module 714 may also be for including the indication of a part of the communication network which may be accessed using the identified supported at least one EAP method in a probe response, which may be sent in response to a probe request received from the device operable to request communication network access. The Transmission module 714 may also be for including the indication of a part of the communication network which may be accessed using the identified supported at least one EAP method in vendor specific signalling or in control or data signalling.

In one example, the above described modules may be implemented with help from a computer program which, when run on a processor, causes the above described modules to cooperate to carry out examples of the methods 100, 200 as described above.

Figure 14:
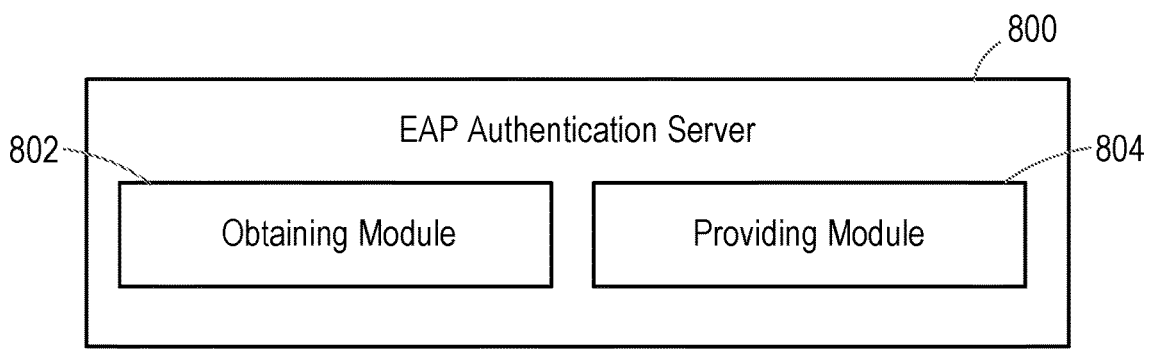
FIG. 14 is a block diagram illustrating functional elements in another example of EAP authentication server.

FIG. 14 illustrates functional units in another embodiment of EAP authentication server 800 which may execute the methods 300, 400 for example according to computer readable instructions received from a computer program. It will be understood that the units illustrated in FIG. 14 are software implemented functional units, and may be realised in any appropriate combination of software modules.

Referring to FIG. 14, the EAP authentication server 800 comprises an Obtaining module 802 for receiving a request for identification of EAP methods supported by the EAP authentication server. The EAP authentication server 800 also comprises a Providing module 804 for sending a response to the request identifying at least one EAP method supported by the EAP authentication server.

The Obtaining module 802 may be for receiving the request from an EAP authenticator or from another EAP authentication server trusted by the EAP authentication server 800. The Providing module 804 may be for sending a response to the EAP authenticator or to the other EAP authentication server trusted by the EAP authentication server 800.

The Obtaining module 802 may also be for forwarding the request to another EAP authentication server trusted by the EAP authentication server 800 and for receiving a response to the forwarded request. The Providing module 804 may be for forwarding the response to the originator of the request. In some examples, the Providing module 804 may be for assembling the supported EAP methods in response(s) received from trusted server(s) together with supported EAP method or methods for the EAP authentication server 800, and for sending all of the supported EAP methods in a single response. Alternatively, the Providing module 804 may be for forwarding responses as they are received by the Obtaining module 802.

The request for identification of EAP methods supported by the EAP authentication server may include an identity and a part of the communication network to be accessed, and the Providing module 804 may be for sending a message proposing an EAP method for the received identity.

The request for identification of EAP methods supported by the EAP authentication server may include a request for an indication of a part of the communication network which may be accessed using the identified supported methods, and the Providing module 804 may be for sending in the response to the request an indication of a part of the communication network which may be accessed using the identified supported at least one EAP method.

The part of the network may comprise a network domain or a network slice, and the response may match each individual EAP method with the domain or slice which may be accessed using that EAP method. The Obtaining module 802 may forward the included request for an indication of a part of the communication network to trusted EAP authentication servers, and the Providing module 804 may forward the corresponding response or responses to the originator of the request.

In one example, the above described modules may be implemented with help from a computer program which, when run on a processor, causes the above described modules to cooperate to carry out examples of the methods 300, 400 as described above.

Figure 15:
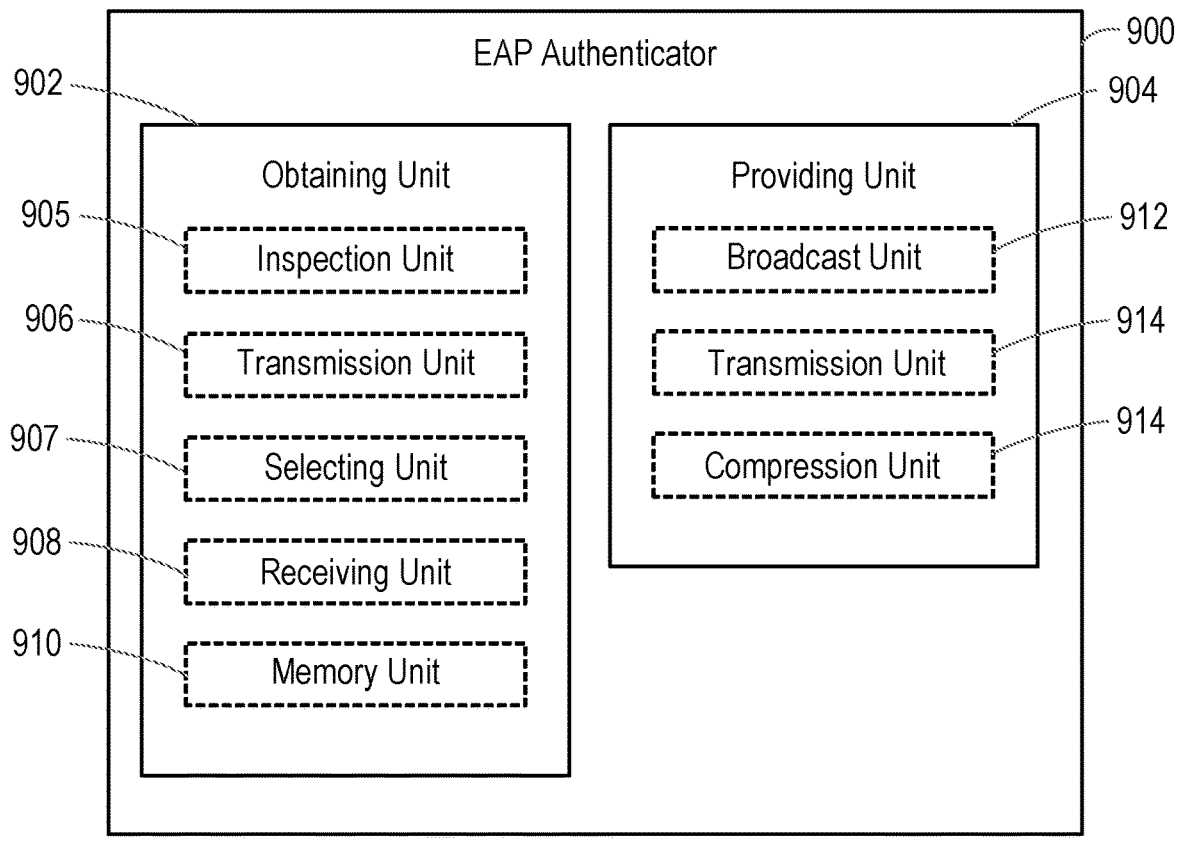
FIG. 15 is a block diagram illustrating functional elements in another example of EAP authenticator.

FIG. 15 illustrates functional units in another embodiment of EAP authenticator 900 which may execute the methods 100, 200 for example according to computer readable instructions received from a computer program. It will be understood that the units illustrated in FIG. 15 are hardware implemented functional units, and may be realised in any appropriate combination of hardware units.

Referring to FIG. 15, the EAP authenticator 900 comprises an Obtaining unit 902 configured to obtain an identification of at least one EAP method supported by an EAP authentication server providing an EAP authentication service to the EAP authenticator, wherein the Obtaining unit 902 obtains the identification from a network entity in the communication network or from inspection of traffic through the EAP authenticator 900. The EAP authenticator 900 also comprises a Providing unit 904 configured to provide the identification of at least one EAP method to a device operable to request communication network access from the EAP authenticator.

The Obtaining unit 902 may comprise an Inspection unit 905 configured to inspect device access requests submitted to the EAP authenticator and for determining which access requests are successfully authenticated. The Obtaining unit may also comprise a Memory unit 910 configured to save the EAP method used in the determined successfully authenticated access requests to a list.

The Obtaining unit 902 may comprise a Transmission unit 906 configured to send a request to the network entity for identification of EAP methods supported by the EAP authentication server, and a Receiving unit 908 configured to receive from the network entity a response identifying at least one EAP method supported by the EAP authentication server. The Transmission unit 906 may be configured to send the request to the EAP authentication server, or may be configured to send the request to a network entity other than an EAP authentication server, including for example a management node. The Receiving unit 908 may be configured to receive a response from the EAP authentication server, or may be configured to receive a response from the network entity other than an EAP authentication server. The EAP authentication server may be a home EAP authentication server, and the Receiving unit 908 may also be configured to receive an indication of EAP methods supported by remote EAP authentication servers trusted by the home EAP authentication server.

The Obtaining unit 902 may comprise a Selecting unit 907 configured to select a part of the communication network to be accessed, and the Transmission unit 906 may be configured to send to the EAP authentication server an access request for the selected part of the communication network using an identity. The Receiving unit 908 may be configured to receive a message from the EAP authentication server proposing an EAP method for the identity. The Memory unit 910 may be configured to save the proposed EAP method to a list. The identity may for example be an identity of a device requesting communication network access, or may be in a format used by a device operable to request communication network access from the EAP authenticator. The Selecting unit 905, Transmission unit 906, Receiving unit 908 and Memory unit 910 may be configured to repeat the above discussed actions, for example on the basis of a different selected part of the network. In this manner, according to examples of the invention, the EAP authenticator 900 may build up a list of supported EAP methods for different parts of the network. If the EAP authentication server is a home EAP authentication server, the messages may include EAP methods supported by remote EAP authentication servers trusted by the home EAP authentication server.

The Selecting unit 905 may be configured to select a part of the communication network to be accessed by performing at least one of selecting a communication network domain associated to a specific EAP method in a standard document, selecting a communication network domain configured in the EAP authenticator as supported by the EAP authentication server, or selecting a communication network domain to which a device has successfully connected via the EAP authenticator in the past.

According to examples of the EAP authenticator 900, the Providing unit 904 may comprise a Broadcast unit 912 configured to broadcast the identification of at least one EAP method, for example by including the identification of at least one EAP method in a beacon broadcast according to IEEE 802.11. The Providing unit 904 may also comprise a Transmission unit 914 configured to include the identification of at least one EAP method in a probe response, which may be sent in response to a probe request received from the device operable to request communication network access. The Transmission unit 914 may also be configured to include the identification of at least one EAP method in vendor specific signalling or in control or data signalling. The Providing unit 904 may also comprise a Compression unit 916 configured to provide a compressed representation of the identification of at least one EAP method. The compressed representation may for example be a binary representation such as bloom filter.

The Obtaining unit 902 may also be configured to obtain an indication of a part of the communication network which may be accessed using the identified supported at least one EAP method, wherein the indication is obtained from the network entity of the communication network or from inspection of traffic through the EAP authenticator. The part of the network may comprise at least one of a network domain or a network slice. The Providing unit 904 may be configured to provide the indication of a part of the communication network which may be accessed using the identified supported at least one EAP method to the device operable to request communication network access from the EAP authenticator.

The Broadcast unit 912 may be configured to broadcast the indication of a part of the communication network which may be accessed using the identified supported at least one EAP method, for example by including the indication in a beacon broadcast according to IEEE 802.11. The Transmission unit 914 may also be configured to include the indication of a part of the communication network which may be accessed using the identified supported at least one EAP method in a probe response, which may be sent in response to a probe request received from the device operable to request communication network access. The Transmission unit 914 may also be configured to include the indication of a part of the communication network which may be accessed using the identified supported at least one EAP method in vendor specific signalling or in control or data signalling.

In one example, the above described units may be implemented with help from a computer program which, when run on a processor, causes the above described units to cooperate to carry out examples of the methods 100, 200 as described above.

Figure 16:
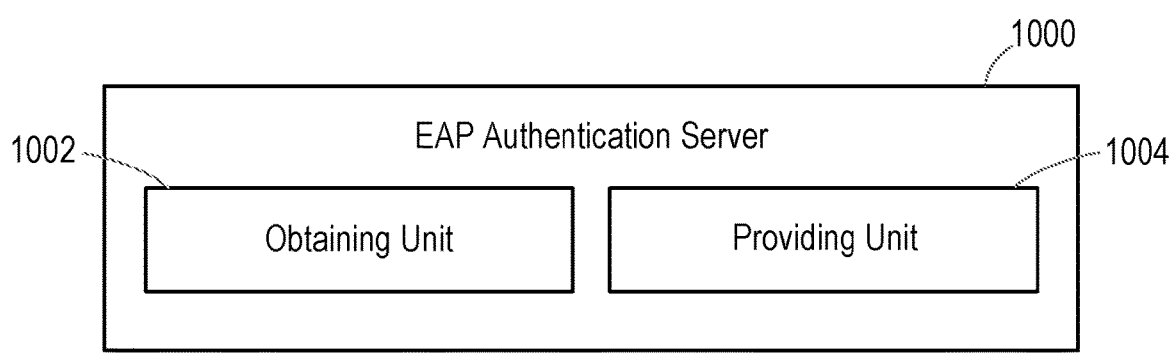
FIG. 16 is a block diagram illustrating functional elements in another example of EAP authentication server.

FIG. 16 illustrates functional units in another embodiment of EAP authentication server 1000 which may execute the methods 300, 400 for example according to computer readable instructions received from a computer program. It will be understood that the units illustrated in FIG. 16 are hardware implemented functional units, and may be realised in any appropriate combination of hardware units.

Referring to FIG. 16, the EAP authentication server 1000 comprises an Obtaining unit 1002 configured to receive a request for identification of EAP methods supported by the EAP authentication server. The EAP authentication server 1000 also comprises a Providing unit 1004 configured to send a response to the request identifying at least one EAP method supported by the EAP authentication server.

The Obtaining unit 1002 may be configured to receive the request from an EAP authenticator or from another EAP authentication server trusted by the EAP authentication server 1000. The Providing unit 1004 may be configured to send a response to the EAP authenticator or to the other EAP authentication server trusted by the EAP authentication server 1000.

The Obtaining unit 1002 may also be configured to forward the request to another EAP authentication server trusted by the EAP authentication server 1000 and may be configured to receive a response to the forwarded request. The Providing unit 1004 may be configured to forward the response to the originator of the request. In some examples, the Providing unit 1004 may be configured to assemble the supported EAP methods in response(s) received from trusted server(s) together with supported EAP method or methods for the EAP authentication server 1000, and may be configured to send all of the supported EAP methods in a single response. Alternatively, the Providing unit 1004 may be configured to forward responses as they are received by the Obtaining unit 1002.

The request for identification of EAP methods supported by the EAP authentication server may include an identity and a part of the communication network to be accessed, and the Providing unit 1004 may be configured to send a message proposing an EAP method for the received identity.

The request for identification of EAP methods supported by the EAP authentication server may include a request for an indication of a part of the communication network which may be accessed using the identified supported methods, and the Providing unit 1004 may be configured to send in the response to the request an indication of a part of the communication network which may be accessed using the identified supported at least one EAP method.

The part of the network may comprise a network domain or a network slice, and the response may match each individual EAP method with the domain or slice which may be accessed using that EAP method. The Obtaining unit 1002 may be configured to forward the included request for an indication of a part of the communication network to trusted EAP authentication servers, and the Providing unit 1004 may be configured to forward the corresponding response or responses to the originator of the request.

In one example, the above described units may be implemented with help from a computer program which, when run on a processor, causes the above described units to cooperate to carry out examples of the methods 300, 400 as described above.

According to examples of the invention, the EAP authenticator 700, 900 may comprise at least one of a wireless Access Point (AP) a Mobility Management Entity (MME), a Slice Selection Function (SSF), and/or a 3GPP basestation. The 3GPP basestation may for example be an enhanced NodeB or a 5G basestation. The EAP authentication server 800, 1000 may comprise at least one of a RADIUS server, a DIAMETER server, or a 3GPP Authentication, Authorisation, Accounting, AAA, server, such as a Home Subscriber Service (HSS).

Aspects of the present invention thus provide methods and apparatus according to which an EAP authenticator may obtain an identification of an EAP method or methods supported by an EAP authentication server providing authentication services to the authenticator, and may then provide this indication to a device operable to request communication network access from the EAP authenticator. Providing this information to devices operable to request network access enables such devices to select appropriate credentials, so avoiding delays associated with a trial and error approach and thus improving user experience. The number of messages exchanged between a device and EAP authenticator may be reduced by eliminating the need for trial and error to identify a suitable EAP method and credentials. This represents a more efficient use of radio resources for a wireless or 3GPP implementation, as well as offering energy efficiencies for resource constrained devices in which battery power may be limited. In addition, service discovery is improved according to certain examples of the invention, as a device may identify an EAP authenticator via which it may access the services it requires. Examples of the invention may also assist in the development of pre-association service discovery over Wi-Fi infrastructure networks, also known as network initiated device association. Finally, in future 3GPP networks, in which concepts including network slicing and non-SIM based authentication may be implemented, examples of the invention may assist with service delivery, providing devices with information about network slices which may be accessed via different EAP authenticators.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by an Extensible Authentication Protocol ("EAP") authenticator in a communication network, the method comprising:
   inspecting a plurality of device access requests submitted to the EAP authenticator from at least one first device;
   determining a set of the plurality of device access requests that were successfully authenticated;
   storing an identification of at least one EAP method in a list, the at least one EAP method supported by an EAP authentication server providing an EAP authentication service to the EAP authenticator and having been used in at least one device access request of the set of the plurality of device access requests submitted to the EAP authenticator from the at least one first device that was successfully authenticated;
   determining to provide the identification of the at least one EAP method to a second device based on the at least one EAP method having been used in the at least one device access request submitted to the EAP authenticator from the at least one first device that was successfully authenticated;
   obtaining the identification of the at least one EAP method supported by EAP authentication server providing the EAP authentication service to the EAP authenticator from the list; and
   subsequent to determining to provide the identification of the at least one EAP method to the second device, providing the identification of the at least one EAP method to the second device operable to request communication network access from the EAP authenticator, the second device being separate from the at least one first device.

2. The method of claim 1, wherein obtaining the identification of the at least one EAP method supported by the EAP authentication server providing the EAP authentication service to the EAP authenticator comprises:
   sending a request to the network entity for identification of the at least one EAP method supported by the EAP authentication server; and
   receiving from the network entity a response identifying the at least one EAP method supported by the EAP authentication server.

3. The method of claim 2, wherein the EAP authentication server is a home EAP authentication server, and the response from the network entity further identifies any of the at least one EAP method supported by remote EAP authentication servers trusted by the home EAP authentication server.

4. The method of claim 1, wherein obtaining an identification of the at least one EAP method supported by the EAP authentication server providing an EAP authentication service to the EAP authenticator comprises:
   selecting a part of the communication network to be accessed;
   sending to the EAP authentication server an access request for the selected part of the communication network using an identity;
   receiving a message from the EAP authentication server proposing an EAP method for the identity; and
   saving the proposed EAP method to a list.

5. The method of claim 4, wherein selecting a part of the communication network to be accessed comprises at least one of:
   selecting a communication network domain associated to a specific EAP method in a standard document;
   selecting a communication network domain configured in the EAP authenticator as supported by the EAP authentication server; or
   selecting a communication network domain to which a device has successfully connected via the EAP authenticator in the past.

6. The method of claim 4, wherein the identity comprises an EAP status check identity, which is reserved for the obtaining of identification of the at least one EAP method supported in the EAP application server.

7. The method of claim 1, wherein providing the identification of the at least one EAP method to a device operable to request communication network access from the EAP authenticator comprises:
   broadcasting the identification of the at least one EAP method.

8. The method of claim 7, broadcasting the identification of the at least one EAP method comprises including the identification of the at least one EAP method in a beacon broadcast according to IEEE 802.11.

9. The method of claim 1, wherein providing the identification of at least one EAP method to the device operable to request communication network access from the EAP authenticator comprises:
   including the identification of the at least one EAP method in a probe response, sent in response to a probe request received from the device operable to request communication network access.

10. The method of claim 1, wherein providing the identification of the at least one EAP method to the device operable to request communication network access from the EAP authenticator comprises:
    including the identification of the at least one EAP method in vendor specific signaling.

11. The method of claim 1, wherein providing the identification of the at least one EAP method to the device operable to request communication network access from the EAP authenticator comprises:
    including the identification of the at least one EAP method in control or data signaling.

12. The method of claim 1, wherein providing the identification of the at least one EAP method to the device operable to request communication network access from the EAP authenticator comprises:
    providing a compressed representation of the identification of the at least one EAP method.

13. The method of claim 1, further comprising:
    obtaining an indication of a part of the communication network which may be accessed using the at least one EAP method, wherein the indication is obtained from the network entity of the communication network or from inspection of traffic through the EAP authenticator.

14. The method of claim 13, wherein the part of the network comprises at least one of a network domain or a network slice.

15. The method of claim 13, wherein the indication of a part of the communication network which may be accessed using the identified supported at least one EAP method matches each identified supported EAP method to a part of the communication network which may be accessed using that identified supported EAP method.

16. The method of claim 13, further comprising providing the indication of a part of the communication network which may be accessed using the at least one EAP method to the device operable to request communication network access from the EAP authenticator.

17. The method of claim 16, wherein providing the indication of a part of the communication network which may be accessed using the at least one EAP method to the device operable to request communication network access from the EAP authenticator comprises:
broadcasting the indication of a part of the communication network which may be accessed using the identified supported at least one EAP method.

18. An Extensible Authentication Protocol ("EAP"), authenticator in a communication network, the EAP authenticator comprising:
processing circuitry; and
memory coupled to the processing circuitry and having instructions stored therein that are executable by the processing circuitry to cause the EAP authenticator to perform operations, the operations comprising:
inspecting a plurality of device access requests submitted to the EAP authenticator from at least one first device;
determining a set of the plurality of device access requests that were successfully authenticated;
storing an identification of at least one EAP method in a list, the at least one EAP method supported by an EAP authentication server providing an EAP authentication service to the EAP authenticator and having been used in at least one device access request of the set of the plurality of device access requests submitted to the EAP authenticator from the at least one first device that was successfully authenticated;
determining to provide the identification of the at least one EAP method to a second device based on the at least one EAP method having been used in the at least one device access request submitted to the EAP authenticator from the at least one first device that was successfully authenticated;
obtaining the identification of the at least one EAP method supported by EAP authentication server providing the EAP authentication service to the EAP authenticator from the list; and
subsequent to determining to provide the identification of the at least one EAP method to the second device, providing the identification of the at least one EAP method to a second device operable to request communication network access from the EAP authenticator, the second device being separate from the at least one first device.

19. The EAP authenticator of claim 18, wherein obtaining the identification of the at least one EAP method supported by the EAP authentication server providing the EAP authentication service to the EAP authenticator comprises:
sending a request to the network entity for identification of the at least one EAP method supported by the EAP authentication server; and
receiving from the network entity a response identifying the at least one EAP method supported by the EAP authentication server,
wherein the EAP authentication server is a home EAP authentication server, and
wherein the response from the network entity further identifies any of the at least one EAP method supported by remote EAP authentication servers trusted by the home EAP authentication server.

20. A non-transitory computer-readable medium having instructions stored therein that are executable by a processor of an Extensible Authentication Protocol ("EAP") authenticator in a communication network to cause the EAP authenticator to perform operations, the operations comprising:
inspecting a plurality of device access requests submitted to the EAP authenticator from at least one first device;
determining a set of the plurality of device access requests that were successfully authenticated;
storing an identification of at least one EAP method in a list, the at least one EAP method supported by an EAP authentication server providing an EAP authentication service to the EAP authenticator and having been used in at least one device access request of the set of the plurality of device access requests submitted to the EAP authenticator from the at least one first device that was successfully authenticated;
determining to provide the identification of the at least one EAP method to a second device based on the at least one EAP method having been used in the at least one device access request submitted to the EAP authenticator from the at least one first device that was successfully authenticated;
obtaining the identification of the at least one EAP method supported by EAP authentication server providing the EAP authentication service to the EAP authenticator from the list; and
subsequent to determining to provide the identification of the at least one EAP method to the second device, providing the identification of the at least one EAP method to a second device operable to request communication network access from the EAP authenticator, the second device being separate from the at least one first device.

* * * * *